DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 2, 1970

875 O.G. 12

T875,005

TONER COMPOSITION FOR DEVELOPING ELECTROSTATIC IMAGES

George L. Beyer, Webster, and Raymond J. Rauscher, Rochester, N.Y. (both of Kodak Park Works, Rochester, N.Y. 14650)

Filed Dec. 4, 1969, Ser. No. 882,325

Int. Cl. G03g *9/02*

U.S. Cl. 96—1

No Drawing. 11 Pages Specification

Toner particles for use in developing electrostatic charge patterns are comprised of about 1 to 20% by weight of a colorant and from about 99 to 80% by weight of a thermoplastic binder component containing a polyamide resin having a sharp melting point and a modifying resin which can be a rosin, a rosin ester, a halogenated polyphenyl resin, a coumarone-indene resin and mixtures. The polyamide comprises about 30 to about 50% by weight of the binder component and the remainder is comprised of one or more modifying resins. The toner particles have a sharp softening point within the range of about 70 to 125° C. a melt viscosity between about 60 and 600 poise and an average particle size of about ½ to 30 microns. Developer compositions are formed by admixing about 1 to 10% by weight of toner particles with about 99 to 90% by weight of carrier particles. Suitable carriers include magnetic materials such as iron particles as well as nonmagnetic materials such as glass beads.